United States Patent
Appalaraju et al.

(10) Patent No.: US 11,893,012 B1
(45) Date of Patent: Feb. 6, 2024

(54) CONTENT EXTRACTION USING RELATED ENTITY GROUP METADATA FROM REFERENCE OBJECTS

(71) Applicant: Amazon Technologies, Inc., Seattle, WA (US)

(72) Inventors: Srikar Appalaraju, Mountain View, CA (US); Raghavan Manmatha, San Francisco, CA (US); Bhargava Urala Kota, Buffalo, NY (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 17/334,188

(22) Filed: May 28, 2021

(51) Int. Cl.
*G06F 16/245* (2019.01)
*G06V 30/418* (2022.01)
*G06N 3/08* (2023.01)
*G06V 30/18* (2022.01)

(52) U.S. Cl.
CPC .......... *G06F 16/245* (2019.01); *G06N 3/08* (2013.01); *G06V 30/418* (2022.01); *G06V 30/18* (2022.01)

(58) Field of Classification Search
None
See application file for complete search history.

(56) References Cited

U.S. PATENT DOCUMENTS

| | | | |
|---|---|---|---|
| 6,687,404 B1 * | 2/2004 | Hull | G06V 30/40 382/226 |
| 8,411,960 B2 | 4/2013 | Misawa et al. | |
| 8,897,563 B1 | 11/2014 | Welling et al. | |
| 9,098,471 B2 | 8/2015 | Richardson et al. | |
| 10,235,681 B2 | 3/2019 | Chang et al. | |
| 10,467,464 B2 | 11/2019 | Chen et al. | |
| 10,489,439 B2 | 11/2019 | Calapodescu et al. | |
| 10,832,046 B1 * | 11/2020 | Al-Gharaibeh | G06F 40/40 |
| 2002/0075514 A1 * | 6/2002 | Wright | H04N 1/00204 358/1.15 |
| 2005/0289182 A1 * | 12/2005 | Pandian | G06Q 10/10 |
| 2014/0068540 A1 * | 3/2014 | Huang | G06F 30/392 716/122 |
| 2019/0034503 A1 | 1/2019 | Ephrat et al. | |

OTHER PUBLICATIONS

Mohammad Norouzzadeh; Automatically identifying, counting, and describing wild animals in camera-trap images with deep learning; PNAS; 2018; pp. 716-725 (Year: 2018).*
U.S. Appl. No. 17/230,784, filed Apr. 14, 2021, Anand Dhandhania et al.
U.S. Appl. No. 16/843,807, filed Apr. 8, 2020, Oron Anschel et al.
U.S. Appl. No. 17/710,409, filed Mar. 31, 2022, Martin Schuetz, et al.

* cited by examiner

*Primary Examiner* — Albert M Phillips, III
*Assistant Examiner* — Jermaine A Mincey
(74) *Attorney, Agent, or Firm* — Robert C. Kowert; Kowert, Hood, Munyon, Rankin & Goetzel, P.C.

(57) ABSTRACT

Representations of sets of descriptors of reference objects are stored in a repository, with individual descriptors including information about entities identified in the reference objects. In response to a request to extract content from a particular data object, a reference object which satisfies a similarity criterion with respect to the particular data object is identified from the repository using the descriptors. A structural comparison of the particular data object and the reference object is performed to determine an entity related to another entity identified in the particular data object.

20 Claims, 10 Drawing Sheets

CONTENT EXTRACTION USING RELATED ENTITY GROUP METADATA FROM REFERENCE OBJECTS

BACKGROUND

Many modern computing applications employ machine learning algorithms and models. Deep learning models, which typically include numerous hidden neural network layers at which values of thousands (or even millions) of model parameters are learned, have been used for generating inferences with in a wide variety of application domains including object recognition, text analysis, video analysis, game playing, time series prediction and the like. Sophisticated machine learning models can be run on servers equipped with graphics processing units (GPUs) and/or other special-purpose chips designed specifically for machine learning computations, enabling models of very high complexity to be used behind the scenes for a variety of end user applications.

For some types of machine learning models such as supervised deep learning models, very large labeled training data sets may be needed to obtain inference results of the desired quality levels. In applications like content extraction from documents which may contain complex forms and tables, for example, the contents of tens of thousands of example documents may have to be labeled to generate the training data for a deep learning model to enable the model to accurately recognize relationships between content elements (such as key-value relationships in forms, or column-row relationships in tables) within the documents.

As more and more new types of documents have to be analyzed at such applications over time, retraining the models using ever larger sets of training examples that capture the salient characteristics of the new documents types may become a non-trivial technical challenge. Even after such training data sets are generated and used to prepare the models, in some cases the accuracy of the results may not be sufficient for the stringent demands of content analysis applications, in which even small errors in the extracted content (such as the mistaken interpretation of a single digit within a quantity in a financial form) can have substantial negative consequences.

Figure 1:
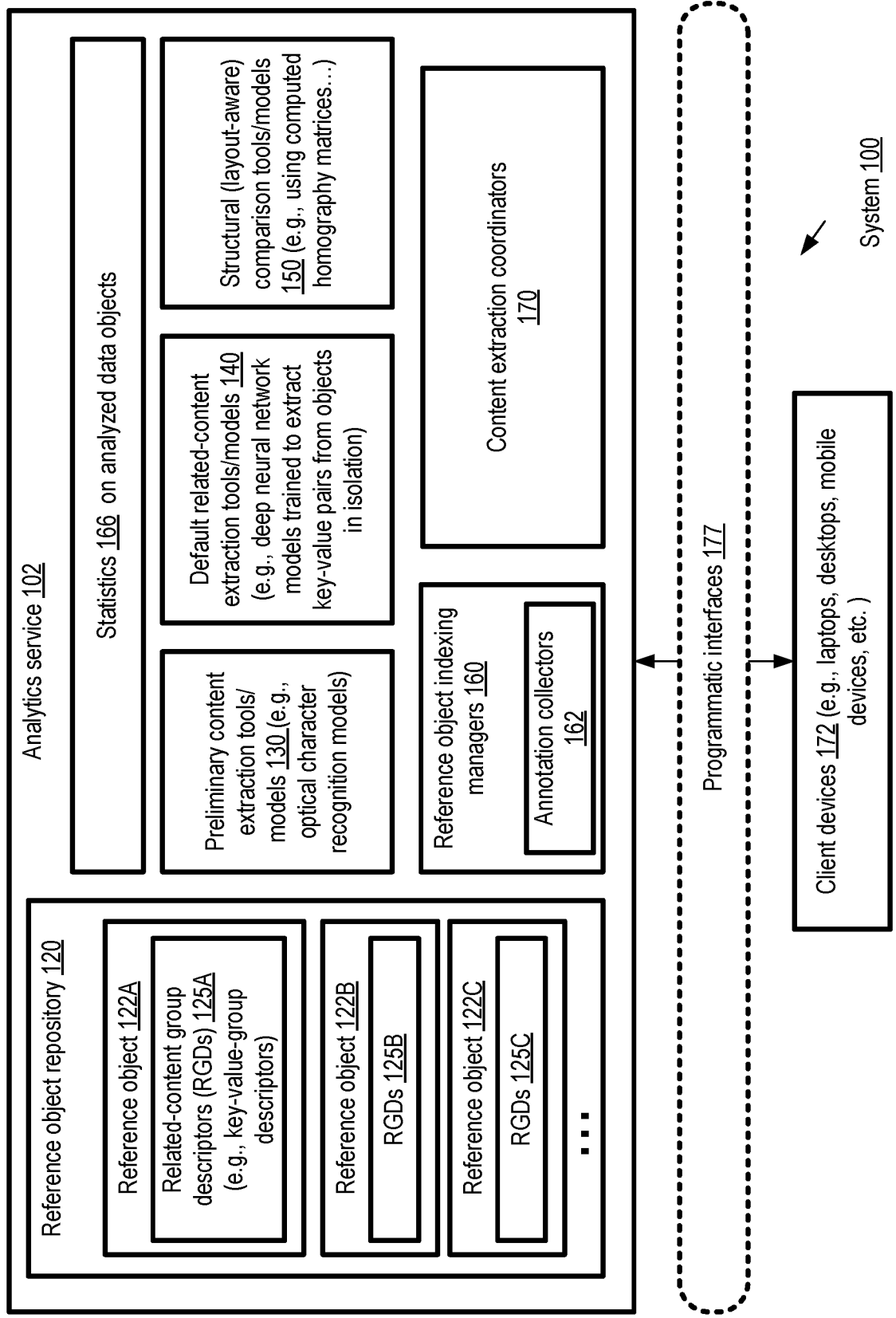
FIG. 1 illustrates an example system environment in which structural comparison using reference objects may be utilized to extract content from target data objects at an analytics service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for accurately and efficiently extracting content about related entities (such as key-value pairs) from images or other representations of target data objects, using machine learning techniques for layout-aware comparisons between a set of pre-obtained reference objects and the target data objects. One intuition underlying the proposed methodology is that many data objects whose content is to be extracted in an automated manner, e.g., by analytics services of provider networks or cloud computing environments, such as images or scans of financial documents, belong to a set of common categories for which frequent content extraction requests are expected. For example, in a given country or other legal jurisdiction, the type of information that has to be included in an income statement, a tax-related form, an investment-related form, a medical claim, etc., may be defined by applicable laws, regulations or customs of the organizations involved in preparing or generating the documents. In some cases, even the layout of the different information elements (e.g., where, within a given kind of document, individuals' names, addresses, etc. are typically positioned) may be standardized to at least some extent. As a result, it becomes possible, at least in principle, to extract the information from previously unseen target documents of the more frequently encountered categories with high accuracy if (a) properties of the different types of documents expected to be analyzed frequently can be collected and stored in advance, and (b) a reasonable probabilistic prediction can be made using the collected properties about the particular document type to which a target document is likely to belong.

In the proposed approach, metadata (such as information about the types of content included in a particular common category of document, the relative locations of the different elements of content within the documents, and so on) about various categories of data objects is captured in the form of annotated or pre-analyzed examples of the categories and stored in a repository or database which is indexed for efficient searches in various embodiments. Such examples may be referred to as "reference" data objects herein, as they serve as canonical or authoritative sources of information about the content of other data objects which belong to the same categories, even though the images or representations of the other data objects may in practice be slightly different in structure or layout from the images or representations of the reference objects in some cases. When a request to extract content from a new, previously unseen target data object is received, in some embodiments e.g., at an analytics service at which the reference object-based methodology is employed, a preliminary analysis of the target data object is performed to obtain raw predicted content (e.g., characters, words etc. in the case of text documents, as well as bounding boxes of the text tokens) of the target data object. Using at least a portion of the results of the preliminary analysis, the repository of reference objects may be searched to identify a set of one or more reference object which appear to be similar to the target data object—e.g., if the number of text tokens that appear in both data objects is above a threshold, the reference object may be designated as sufficiently similar. Such reference objects may be referred to as "similar reference objects" or SROs.

At this stage of the analysis, the raw or token-level content of the target data object may have been obtained and examined to identify the SROs, but information about relationships between elements or entities of the content (such as relationships between some text tokens that are keys, and other text tokens that are values for those keys) may not have been considered. To perform the relationship analysis, a more fine-grained technique may be employed in various embodiments, in which in effect the layout or structure of the SROs may be compared to the layout or structure of the target data object. Using such layout-aware analysis, the approximate positions or locations within the target data objects at which values of entities (e.g., values) related to other entities that have previously been identified in the raw content (e.g., keys) are expected to be present may be identified. The layout-aware analysis may itself include multiple stages in some embodiments, e.g., one stage in which correspondences between elements of the target data object and elements of the SROs are detected, and another stage in which homography matrices are used to determine potential mappings or projections between elements of the SROs and the target data objects. Values corresponding to various types of relationships among content elements/ entities may then be extracted from the target data objects, and transmitted/provided to one or more destinations. In effect, the prior knowledge about expected properties of frequently-analyzed categories of data objects can be utilized to expedite, and improve the quality of, predictions of extracted content from target data objects. Of course, at various stages of the pipeline of data object analysis, it may become clear (in a probabilistic sense) in some cases that the new or target document does not belong to a category for which a reference document has been obtained earlier, in which case a default or fallback approach for analyzing unrecognized types of data objects may be employed to obtain predictions for the relationships between content elements of the target document. In some cases the default approach may involve the use of a deep neural network which examines each target data object in isolation, e.g., without taking reference objects into account.

As one skilled in the art will appreciate in light of this disclosure, certain embodiments may be capable of achieving various advantages, including some or all of the following: (a) enhancing the overall accuracy of content extracted from data objects such as documents, especially in scenarios in which the data objects belong to a class of frequently-analyzed items for which reference or example data objects have been collected earlier, (b) reducing the amount of computing, memory, storage and other resources that have to be dedicated to content extraction models and algorithms, compared for example to scenarios in which a default neural network model is used for all target data objects, and/or (c) reducing the time and computing resources required to enable an analytics service to start accurate content extraction for data objects which belong to new frequently-occurring categories, since only a small number of reference examples (or even a single reference example) for a given new category may be sufficient to enable the analytics service to learn how to extract content from data objects of the new categories (in contrast to, for example, some supervised learning techniques which may require thousands of labeled objects for training). In experiments performed in a production-level computing environment, the time taken to extract predicted content from some types of documents using the techniques proposed herein was lower by orders of magnitude relative to the time taken when using a neural network model. Furthermore, the accuracy of the predictions using the proposed techniques was substantially higher than the accuracy of the predictions obtained using the neural network model. Another benefit was that while the execution of the neural network model required the use of GPUs, the proposed techniques were implemented without using GPUs in the experiments—as such, general-purpose processors or CPUs were sufficient, and servers with powerful GPUs were not needed.

According to some embodiments, a system may comprise one or more computing devices. The computing devices may include instructions that upon execution on or across the computing devices cause the computing devices to store, e.g., in a repository of an analytics service of a provider network, representations of one or more reference documents and respective sets of key-value descriptor entries corresponding to content identified within images of individual ones of the one or more reference documents. A particular key-value descriptor may, for example, comprise information about at least a text key within an image of a reference document. In some implementations, for example, a key-value descriptor may include the text tokens or words that make up a key, a bounding box (expressed using a pair of x, y coordinates representing opposite corners of a rectangle, with the origin of the coordinate system corresponding to a particular pixel or position within the image such as the bottom left of the image) within which the text tokens were identified, and/or other elements. More generally, key-value-group descriptors may be stored for reference documents, representing scenarios in which multiple values related to a single key may be expected to be present in a given document; as such, a key-value descriptor may represent one example of a key-value-group descriptor. Key-value-group descriptors may in turn be generalized to, and represent examples of, related-content group descriptors in some embodiments, which may each indicate groups of related content elements or entities that may not necessarily be tied to unique keys as such.

In response to a first request to extract content from an image of a particular document after the descriptors of the reference documents have been stored, an efficient multi-stage pipeline of analysis may be utilized in various embodiments. As part of the pipeline, using a first query directed to the repository, at least a first reference document may be identified, such that a first set of key-value descriptor entries of the first reference document meets a similarity criterion with respect to a second set of key-value descriptor entries identified in the image of the particular document. In some embodiments, the second set of key-value descriptor entries may be obtained at least in part using a first set of one or more machine learning models to which the image of the particular document has been provided as input. Such a set of machine learning models may, for example, comprise an optical character recognition model in some embodiments, which emits words, characters and other text tokens which have been detected within the document, along with their respective bounding boxes. The pipeline may also include performing a layout-aware matching analysis of the particular document and the first reference document to extract, from the particular document, a first predicted value corresponding to a first key in various embodiments. The layout-aware matching analysis may comprise various sub-operations in some embodiments, including computing an estimate of a difference in location of (a) the first key within the particular document image and (b) the first key within the first reference document. Such layout-aware matching analyses may also be referred to as structural comparison analyses in various embodiments.

In response to a second request to extract content from an image of another document after the representations of reference documents have been stored in the repository, in some embodiments, a determination may be made that the repository does not include a reference document whose key-value descriptors meet the similarity criterion with respect to the other image's key-value descriptors. Such a determination may be made, for example, based at least in part on results of another query directed to the repository. In such a scenario, a second set of one or more machine learning models may be employed to extract a predicted value of a second key from the other document. This second set of machine learning models may comprise at least one model (e.g., a deep neural network model) which is not used for the layout-aware matching analysis; as such, a different set of tools may be used for the document for which a sufficiently-similar reference document was not found than is used for documents for which sufficiently-similar reference documents exist in the repository. The techniques of using metadata on reference items for content extraction may be extended to cover a variety of data objects in various embodiments, and is not limited to just documents comprising text. For example, in some embodiments, related entity groups in the content of a data object (e.g., a reference object and/or a target data object) may comprise images, videos, or audio elements.

According to some embodiments, the structural comparison or layout-aware matching analysis may consider a pair of data objects at a time: the target data object and a reference object which was identified from the repository based on a similarity threshold with respect to the target data object. The structural comparison in such embodiments may comprise (a) identifying one or more pairs of corresponding content elements, where an individual pair of corresponding content elements includes a first content element extracted from the target data object and a second content element extracted from the reference object and (b) computing a geometric transformation (e.g., using a homography matrix or a non-rigid transformation algorithm such as a thin plate spline algorithm) between respective first content elements of the one or more pairs and respective second content elements of the one or more pairs. A given corresponding content element pair may, for example, comprise n-grams which are present in both the target data object and the reference object. In some implementations, the corresponding n-grams may be identified using a K-nearest-neighbor (KNN) search conducted with respect to a given n-gram, e.g., using a spatial search algorithm based on ball trees or other similar data structures.

In at least one embodiment, as mentioned above, the content extraction pipeline may be executed at an analytics service of a provider network or cloud computing environment. Clients of such a service may use programmatic interfaces of the service (such as web-based consoles, command-line tools, graphical user interfaces, application programming interfaces (APIs) and the like) to provide guidance regarding various aspects of the content extraction process, submit requests pertaining to content extraction, and so on in various embodiments. In some embodiments, for example, requests to index various reference objects (i.e., analyze the reference objects and store their descriptors or other metadata in the repository) may be obtained from analytics service clients via such interfaces. A representation of one or more key-value group descriptors (or more generally related-content group descriptors) of the reference objects may be stored in the repository in response to such indexing requests in various embodiments. In one embodiment, clients may use the programmatic interfaces to provide thresholds and other parameters used for similarity analysis during search of the repository, and/or in the structural comparison.

Any of a variety of search algorithms may be used in different embodiments to identify the sufficiently similar reference objects, relative to a target data object, within the repository. In some embodiments, relatively simple text token matching may be used, in which text tokens present in the target data object may be matches against text tokens present in the reference objects. In other embodiments, a spatial search in which distances in multidimensional vector space between vector representations of content elements (which may include text, images, other types of media, etc.) of the reference objects and corresponding vector representations of the target data objects may be computed, with smaller distances indicating greater similarity.

In some embodiments, in addition to providing predicted elements of content that have been extracted from target documents in response to client requests, an analytics service may also provide corresponding confidence levels associated with the predictions. In at least one embodiment, the confidence levels associated with the predictions may be computed by aggregating confidence levels generated for the raw content elements extracted from the target data objects prior to the search of the repository. For example, if three tokens T1, T2 and T3 were identified from a text target document using optical character recognition models, with respective confidence levels C1, C2 and C3, the final confidence level associated with key-value pairs comprising T1, T2 and T3 predicted using the structural comparison may be set to a function $f(C1, C2, C3)$, such as the average of C1, C2 and C3 in one implementation.

Explanatory information about the extracted content of a given data object may be provided in some embodiments by an analytics service, e.g., vie programmatic interfaces in response to programmatic requests from clients and/or data scientists interested in debugging or understanding the working of the layout-aware approach. Such explanatory messages may, for example indicate the keys identified, the bounding boxes identified for keys and values, and so on.

In some embodiments, at least a subset of the information stored in the repository, such as portions or all of one or more of the key-value group descriptors, may be obtained via programmatic interfaces from a set of annotators. Human annotators may be employed in some embodiments, while machine learning-based annotation tools may be employed in other embodiments.

According to some embodiments, as mentioned above, an analytics service at which content is extracted from data objects using related-entity metadata obtained from reference objects may be implemented at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources (e.g., including resources at which software containers used for running instrumented machine learning models are executed) that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as the analytics service. In some embodiments, a content extraction service utilizing the techniques introduced herein may be implemented as a separate service from a more general analytics service or machine learning service of a provider network. A VCS may also be referred to as an elastic compute service, virtual machines service, computing cloud service, compute engine, and/or cloud compute in various implementations.

Example System Environment

FIG. 1 illustrates an example system environment in which structural comparison using reference objects may be utilized to extract content from target data objects at an analytics service, according to at least some embodiments. As shown, system 100 may comprise various resources and artifacts of analytics service 102, including content extraction coordinators 170, reference object repository 120, preliminary content extraction tools/models 130, default related-content extraction tools/models 140, structural comparison tools/models 150, and statistics 166 on analyzed data objects in the depicted embodiment. Each of these subcomponents of analytics service 102 may be implemented using some combination of software and hardware of one or more computing devices in various embodiments.

Analytics service 102 may be utilized for several different kinds of tasks, including extracting content (such as key-value pairs, tables, or other subsets of content that are related to one another) from data objects such as documents using machine learning and other tools in the depicted embodiment. It may be possible to group many of the data objects analyzed at the analytics service into frequently-analyzed categories in some embodiments. For example, tens of thousands of documents comprising very similar kinds of financial data or medical data may be processed at analytics service 102 on behalf of a given client of the service, and the service may be designed to take advantage of common properties of such frequently-analyzed categories of documents to improve the accuracy and speed of content extraction in at least some embodiments. Such accuracy and speed enhancements may be achieved by storing metadata obtained from examples of the frequently-accessed categories of data objects, referred to as reference objects. The metadata may later be utilized to generate mappings between new data objects (also referred to as target data objects or query data objects) of a frequently-accessed category, and the appropriate reference objects, making it easier to accurately extract content such as key-value pairs from the new data objects in various embodiments. Of course, at least some of the target data objects from which content is to be extracted may not belong to the frequently-analyzed categories (or may not necessarily be identified as belonging to such categories); for such objects, a default set of tools which do not use reference objects may be utilized in some embodiments.

Analytics service 102 may implement a set of programmatic interfaces 177, such as web-based consoles, command-line tools, graphical user interfaces, APIs and the like in the depicted embodiment. Clients of the analytics service 102 may transmit messages, requests and commands pertaining to content extraction from a variety of client devices 172, and receive corresponding responses, using programmatic interfaces 177. Client devices 172 may include, among others, laptops, desktops, mobile computing devices and the like.

In the embodiment depicted in FIG. 1, representations of various reference objects and respective sets of related-content group descriptors may be stored in reference object repository 120. A related-content group may comprise various elements of content within a given reference object which are related to one another, such as keys and associated values, table column headers and corresponding values for different rows of the table, and so on. A related-content group descriptor (RGD) may comprise information about a related-content group, such as the text tokens which comprise the key of a key-value pair, the approximate location or position (expressed for example using bounding box coordinates) of a key, the approximate location or position of the value or values associated with a key, annotations relating different content elements to one another, and so on.

An RGD may in general comprise various types of information corresponding to content identified within the reference object, at least some of which may be utilized to extract content from target data objects which belong to the same category of frequently-analyzed objects as the reference object. In some embodiments, for example, a reference object may comprise an image of a document which includes text, and an RGD may comprise information about a key-value pair or a key-value-group (in scenarios where a group of values is associated with the same key) identified within the image. In one embodiment, an RGD may simply indicate the text tokens which make up a key (for which one or more values may or may not be present in the reference object). In some embodiments, in addition to the text tokens, an RGD may also indicate approximate or estimated bounding boxes of the text tokens, expressed in a coordinate system assigned to the reference object. In other embodiments, a reference object (or a target data object from which content is to be extracted) may comprise multimedia elements, such as some combination of images, videos, audio and/or text. In the embodiment shown in FIG. 1, the reference object repository 120 comprises reference objects 122A, 122B and 122C. Reference object 122A has one or more RGDs 125A associated with it. Similarly, reference object 122B has one or more associated RGDs 125B, and reference object 122C has one or more associated RGDs 125C.

In some embodiments, clients of the analytics service 102 may provide examples of at least some reference objects via programmatic interfaces 177. For example, a client may submit an indexing request indicating a reference object. In response, a reference object indexing manager 160 of the analytics service may orchestrate the extraction of metadata such as RGDs from the reference object, and store the extracted metadata in the repository 120. In at least one embodiment, a client may provide at least some of the metadata stored at the repository 120 for a reference object, including for example annotations which indicate the relationships between various elements of content with the reference object. In one embodiment, reference object indexing managers 160 may analyze statistics 166 accumulated over time regarding the kinds of data objects from which content has been extracted on behalf of a given client to identify candidate frequently-analyzed object categories, and examples of such frequently-analyzed objects may be added to the reference object repository 120. In at least one embodiment, annotation collectors 162 may be utilized to gather annotations pertaining to reference objects, e.g., from machine learning models designed for automated annotation, or from human annotators, and such annotations may be included in the metadata stored in reference object repository 120. In at least some embodiments, search indexes may be created on the reference objects of repository 120, e.g., using a search service of a provider network, enabling relevant reference objects to be retrieved in response to search queries whose parameters include at least a portion of an RGD or other metadata. In various embodiments, reference object repository 120 may be partitioned into client-specific sub-repositories, such that only those reference objects which contain reference objects associated with a given client of the analytics service can be used for extracting content on behalf of that client.

In response to a request to extract content from a target data object (e.g., an image of a text document) that is not among the reference objects whose representations or metadata have been stored in the repository 120, a multi-step procedure may be initiated in the depicted embodiment, e.g., by a content extraction coordinator 170. In one such step, a query may be directed to the repository 120, and at least one reference object which meets a similarity criterion with respect to the target data object may be retrieved. The parameters of the query may include portions or all of one or more RGDs extracted from the target data object using preliminary content extraction tools/models 130 in the depicted embodiment. In an embodiment in which the target data object is a document image, for example, the preliminary content extraction tools/models may include one or more machine learning models trained to perform optical character recognition (OCR), and the RGDs extracted from the target document image may comprise text tokens (e.g., characters or words, and their bounding boxes within the target document image). Various types of similarity analysis may be performed in different embodiments to identify a reference object which meets a similarity criterion to a target object—for example, a text token match may be conducted, or a spatial search using respective vector representations of at least some portions of the target data object and portions of the reference objects in repository 120 may be conducted. In at least some embodiments, a number of similar reference objects, ranked by decreasing degree or extent of similarity to the target data object, may be identified from the repository in response to a query.

A structural comparison, such as a layout-aware matching analysis in the case of text documents, may then be conducted with respect to the target data object and the one or more reference objects identified as similar to the target data object in various embodiments. One or more structural comparison tools/models 150 may be utilized by the content extraction coordinator 170 in various embodiments. In at least some embodiments, one or more machine learning models for structural comparison may be trained and executed in real time, such as models which learn homography matrices for corresponding features of reference and target images as described below in further detail. The structural comparison may enable the content extraction coordinator 170 to extract predicted values of related content groups, such as respective values corresponding to various keys. In an embodiment in which the target and reference objects are documents, a structural comparison may include a layout-aware matching analysis, which takes the physical layout of various portions of the target document image into account, and includes computing an estimate of a difference in location, within the layout, of (a) a particular key within the target document image and (b) the same key within a reference document.

For some target data objects submitted to analytics service for content extraction, a corresponding reference object that can be used for structural comparison may not have been stored in repository 120. In various embodiments, if a reference object which satisfies the similarity criteria with respect to such a target data object is not found, content may be extracted from the target data object using a default set of related-content extraction tools/models 140. Such tools/models may, for example, comprise one or more deep neural network models which have been trained at the analytics service to extract key-value pairs and other related-content groups from data objects in isolation, i.e., without taking reference objects into account. As such, the training data used for the deep neural network models may include labeled data objects considered one at a time, and the models may learn to extract content such as key-value pairs or key-value groups from the labeled data objects. Such default tools/models may also be utilized as a backup or fallback approach during structural or layout-aware comparison analysis in some cases—e.g., if the distances computed between the content elements of the reference objects and the content elements of a target data object do not satisfy a threshold, or if no applicable reference objects are found in the repository 120. In some embodiments, before attempting to utilize the reference object-based methodology for a given target data object on behalf of a client, a content extraction coordinator 170 may check whether any reference objects associated with that client exist in the repository, and may abandon the reference object-based approach if no such reference objects are present in the repository. Content extracted from a target data object, either using the structural comparison or using the default approach may be provided to one or destinations in various embodiments, such as a client device 172, and/or other machine learning models implementing additional stages of a more complex analysis procedure which require the extracted content as input.

In some embodiments in which the objects being analyzed are text-containing documents, the structural comparison may comprise a preliminary step of identifying corresponding content elements, followed by a geometric transformation step. The corresponding content elements may be identified using n-gram analysis in some implementations, in which n-grams of a chosen token length (e.g., 2 words or tokens, or 3 words/tokens) that are present within both the target document and the reference document are found (if any such matching n-grams exist). It may sometimes be the case that a given n-gram occurs several times in a document; in such scenarios, analysis of the context in which each such n-gram occurs (e.g., nearby words) may be performed in some embodiments, including for example a k-nearest-neighbor search with respect to a given n-gram to resolve the ambiguity among the matches. The contexts of the n-grams in the target and reference object may be compared to narrow down the correspondences in such embodiments. In the geometric transformation step, in some embodiments homography matrices may be learned on the fly using corresponding content elements to in effect project respective portions of a target document onto a reference document, which then, for example, enables values corresponding to keys in the target document to be determined easily.

As indicated earlier, reference objects as well as target data objects may comprise some combination of text, images (e.g., images of other objects may be contained within an image of a document), videos, audio, and/or other types of media in some embodiments. Keys and/or the associated values within the objects may in turn comprise text, images (e.g., icons in the case of keys), videos, audios, and the like; as such, the techniques described herein are agnostic with respect to the data types or media types of the content in various embodiments.

Example Document Image with Key-Value Pairs

Figure 2:
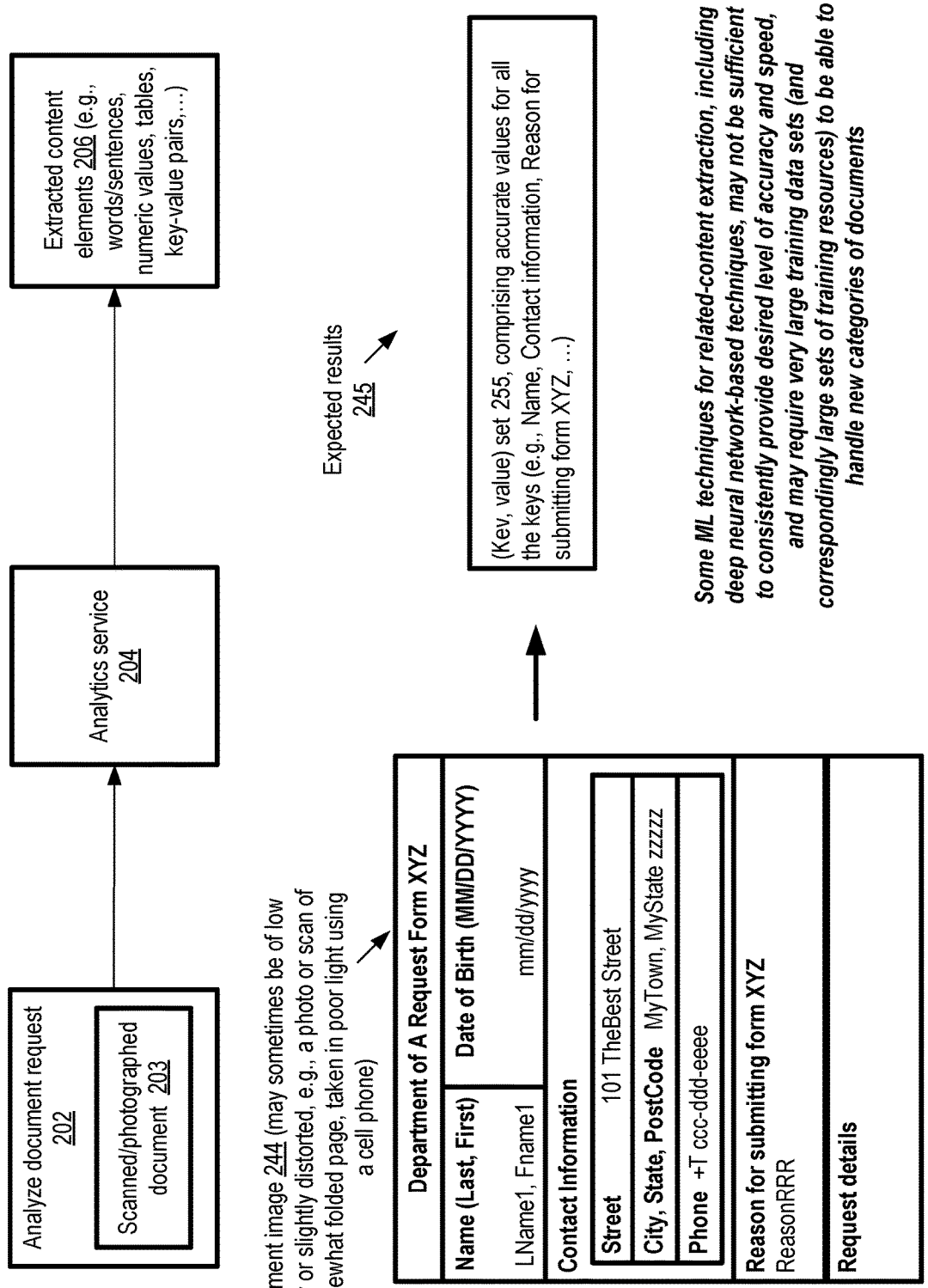
FIG. 2 illustrates an example document image comprising several key-value pairs which may be extracted at the request of a client of an analytics service, according to at least some embodiments.

FIG. 2 illustrates an example document image comprising several key-value pairs which may be extracted at the request of a client of an analytics service, according to at least some embodiments. In the scenario depicted in FIG. 2, a client of an analytics service 204 (similar in functionality to analytics service 102 of FIG. 1) submits an analyze document request 202, indicating a scanned/photographed document 203 as a parameter of the request. The analytics service 204 is then responsible for processing the document and provided a set of extracted content elements 206 to the client. The extracted content elements 206 may, for example, comprise words or sentences, numeric values, tables with column names and corresponding values in one or more rows, key-value pairs or key-value-groups (where more than one value may correspond to a single key), and so on. Among the extracted content elements, some may be stand-alone (i.e., unrelated to other elements) while others may be related (such as keys and values, or tables and respective values for each header).

The document image 244 provided by the client may sometimes be of low quality or slightly distorted, e.g., a photo or scan of a somewhat folded page, taken in poor light using a cell phone. Document image 244 is of a "Department of A Request Form XYZ" in the depicted example scenario, and includes various elements containing keys (such as Name, Date of Birth, Contact Information, Reason for submitting form XYZ, and Request details) for which corresponding values (e.g., LName1, Fname1 for the name) may or may not be filled out. In some cases, the values entered for some keys may be hand-written, thus potentially increasing the difficulty of identifying the values. Some keys and corresponding values may be arranged in hierarchies—e.g., a higher-level key such as "Contact Information" may comprise several lower-level keys, such as Street, City, State, Postcode, Phone, and the like. The expected results 245 from the analytics service 204 for document image 244 may comprise a (key, value) set 255, with accurate values for all the keys. A very high degree of accuracy may be required by the client, because extracting even a small content element incorrectly (such as the house number on the street, or a single digit in the date of birth) may lead to substantial negative consequences. An incorrect date of birth may result in rejection of an important request, for example, while an incorrect address or telephone number may result in an individual not receiving a timely response to the request. In addition, for at least some applications, the results may have to be generated very quickly, e.g., within a few milliseconds or seconds at most.

Some conventional machine learning (ML) techniques for related-content extraction, including deep neural network-based techniques, may be insufficient to meet all the document analysis needs of the client in some embodiments. The conventional approaches may not be capable of consistently providing the desired level of accuracy and speed for content extraction, especially in cases in which the document image is distorted or of poor quality. Furthermore, as more categories of documents (e.g., new kinds of forms) have to be analyzed over time, very large data sets (and a substantial amount of training resources and time) may be needed to re-train some ML models. These potential problems may be alleviated, for at least some types of data objects, using the reference object-based techniques described herein.

Overview of Example Content Extraction Methodology

Figure 3:
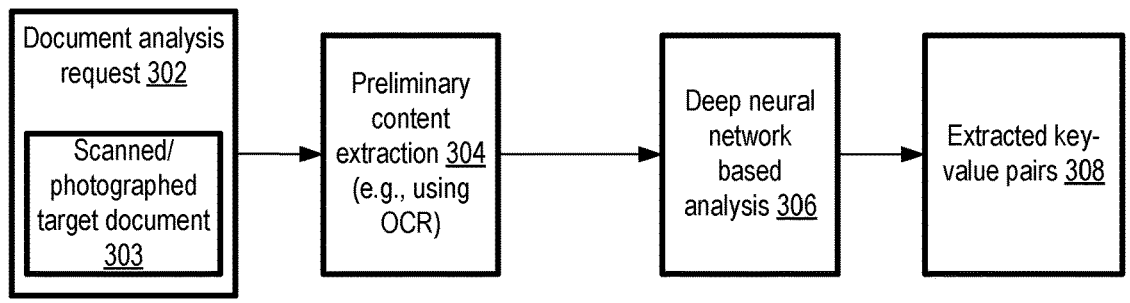
FIG. 3 illustrates an overview of an example content extraction methodology which relies on a structural comparison between target documents and a selected subset of reference documents, according to at least some embodiments.
Figure 3:
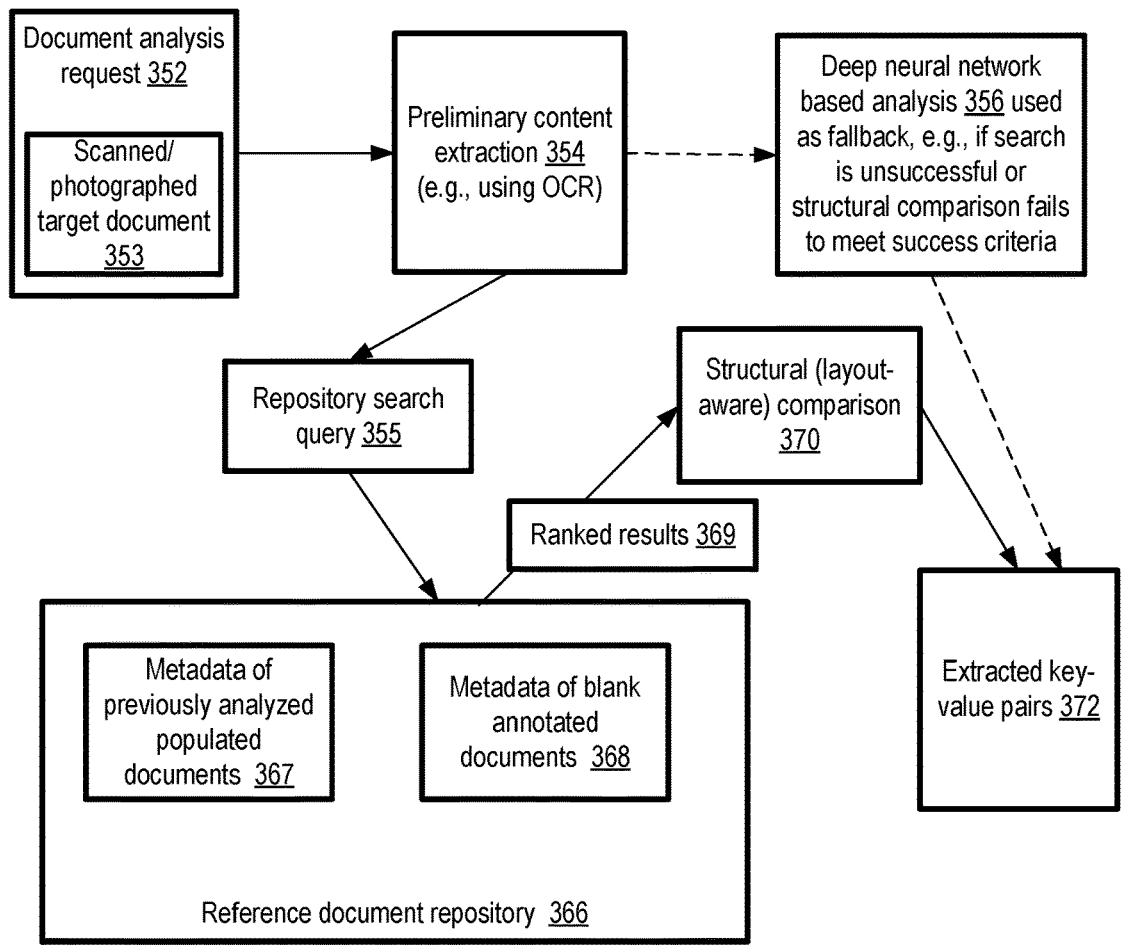

FIG. 3 illustrates an overview of an example content extraction methodology which relies on a structural comparison between target documents and a selected subset of reference documents, according to at least some embodiments. In a conventional content extraction methodology 301, which does not rely on reference documents, preliminary content extraction 304 may first be performed on a scanned/photographed target document 303 indicated in a document analysis request 302. In the preliminary content extraction step, the target document may be provided as input to one or more machine learning models such as optical character recognition (OCR) models, and output comprising detected characters, words, numbers and the like, along with their respective bounding boxes (location information) may be generated. The output of the preliminary content extraction 304 may be supplied as input to a deep neural network based analysis 306 phase, which may perform more fine-grained analysis on the content extracted in the preliminary phase (e.g., by trying to correlated possible keys with corresponding values), and provide extracted key-value pairs 308 as the final result of the methodology 301.

In an enhanced content extraction methodology 351, similar types of preliminary content extraction 354 may be performed on a scanned/photographed target document 353 indicated in a document analysis request 352 in at least some embodiments, e.g., using OCR models and the like. At least some of the results obtained from the preliminary content extraction 354 may then be used to populate parameters of a repository search query 355, formulated in an effort to find reference documents which may make it easier to extract the key-value pairs from the target document. The reference document repository 366 may comprise metadata of at least two types of documents in the depicted embodiment: blank annotated documents 368 (e.g., documents with forms which contain keys but not the corresponding values) and previously analyzed populated documents 367 (e.g., documents with forms which contain values as well as keys). The annotations may, for example, point to tokens which represent keys (since not all the text within the blank documents may necessarily represent keys for which values may be present in target documents). In other embodiments, metadata for only one of these two types of documents may be included in the repository.

A similarity-based search may be conducted in the repository, e.g., among the metadata of the set of reference documents associated with the client on whose behalf the document analysis request 352 is to be processed in various embodiments. In one simple implementation, text token matching may be used for the search, e.g., using a technique similar to TF-IDF (term frequency-inverse document frequency). In other implementations, at least some of the output of the preliminary content extraction 354 may be converted into vector form (e.g., using various embedding techniques) and a search based on distances in the vector space with elements of metadata (such as key-value descriptors) of the reference documents may be conducted.

If some documents whose similarity with the target document satisfies a threshold criterion are found, they may ranked relative to one another (e.g., in descending order of similarity), and the ranked results 369 may be provided as input to a structural (layout-aware) comparison phase 370 of the analysis in the depicted embodiment. In the structural comparison, a more fine-grained and pairwise analysis of the content elements present in the target document and the reference documents indicated in ranked results 369 may be performed in various embodiments, including a corresponding element detection step followed by a geometric transformation and reverse mapping step. Details regarding each of these steps are provided below. Output of the structural comparison 370, comprising for example extracted key-value pairs 372, may be provided as the final result of the enhanced content extraction methodology 351 in the depicted embodiment. Deep neural network based analysis 356, similar to the deep neural network based analysis 306, may be employed as a fallback option in some embodiments, e.g., used only if the search of the repository is unsuccessful (i.e., if a relevant reference document cannot be found in the repository) or of structural comparison fails to meet success criteria (e.g., if the fraction of keys of any ranked reference document for which corresponding keys/values can be found in the target document is below a threshold).

In effect, for target documents for which metadata of corresponding reference documents has been stored in the repository (which may be done for documents of categories expected to be processed in high volumes), the reference document based approach may be utilized most of the time, while the deep neural network-based approach may be used only in exceptional circumstances in the depicted embodiments. In contrast, for one-off or infrequently-analyzed types of target documents, for which no reference documents have been identified and stored in the repository, the fallback deep neural network based approach may be used in at least some embodiments. Note that the entire pipeline of the enhanced methodology 351 may have to be performed in real time, e.g., within less than a second or so in some embodiment to meet the performance requirements of clients of the analytics service.

In one embodiment, a hybrid approach may be employed, which may be useful especially for target documents that are hard to analyze for various reasons. In such a hybrid approach, the deep neural network approach and the structured comparison approach may both be used in parallel if sufficient resources are available at the analytics service, and the results of the two approaches may be combined/aggregated to produce the final results. If both approaches produce identical (or very similar) results, this may increase the confidence in the overall or final results. If there is a substantial difference between the two approaches, in some embodiments the target document may be routed to a human analyst to ensure that content is extracted accurately for the client.

In at least some embodiments, confidence level metrics may be provided with the extracted key-value pairs, indicating respective levels of confidence in each of the key-value pairs (or the extracted collection of key value pairs as a whole). Note that the preliminary content extraction phase may also generate confidence intervals, e.g., associated with individual text tokens and their bounding boxes. In one embodiment, the confidence level information provided for the extracted key-value pairs 372 may be derived by applying a statistical aggregation function to the confidence level metrics generated in the preliminary content extraction step for each of the tokens included in the extracted key-value pairs. For example, if there are 5 text tokens in a given extracted key-value pair KV1, and the preliminary content extraction phase assigned confidence scores (on a scale of 0 to 1, with 1 representing perfect confidence) of $c1$, $c2$, $c5$ to the 5 text tokens, the confidence score associated with extracted key value pair KV1 may be set to the mean of ($c1$, $c2$, $c5$) in one implementation. Other approaches towards estimating confidence levels for results of the reference object-based enhanced methodology may be taken in some embodiments.

Methods for Content Extraction

Figure 4:
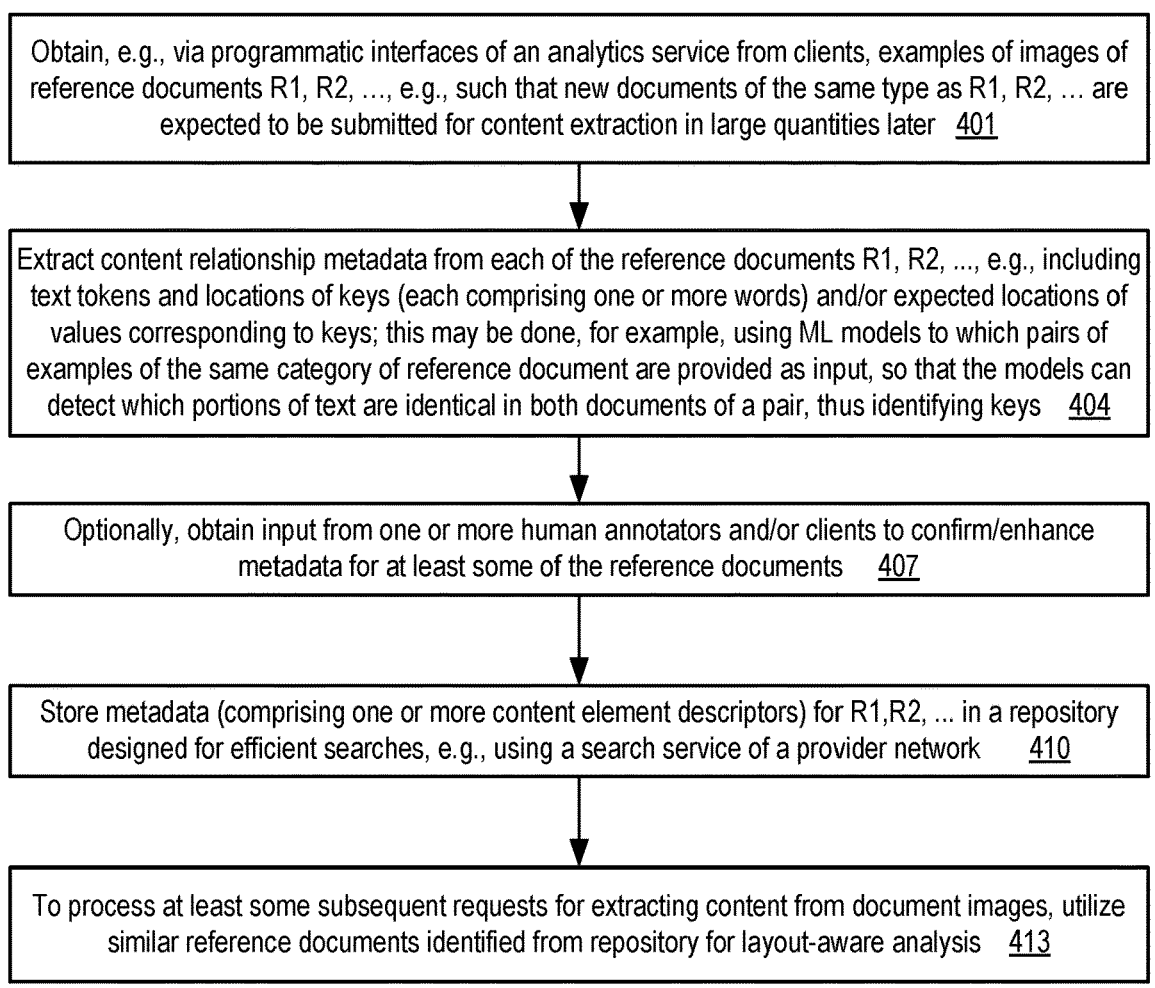
FIG. 4 is a flow diagram illustrating aspects of operations that may be performed to populate a repository with metadata pertaining to reference documents which can be used for extracting content from other documents, according to at least some embodiments.

FIG. 4 is a flow diagram illustrating aspects of operations that may be performed to populate a repository with metadata pertaining to reference documents which can be used for extracting content from other documents, according to at least some embodiments. As shown in element 401, examples of images of a set of reference documents R1, R2, . . . may be obtained, e.g., via programmatic interfaces of an analytics service similar to analytics service 102 of FIG. 1 from clients of the service. The reference documents may at least in some cases belong to categories of documents (e.g., commonly-used financial forms, medical forms etc.) for which analysis requests are expected in high volumes at the analytics service, so that the costs of creating and using the reference document repository can be amortized over a large number of client requests.

Content relationship metadata may be extracted from each of the reference documents R1, R2, . . . , in the depicted embodiment (element 404). Such metadata may, for example, include tokens and/or images/icons which represent keys, locations of the keys (e.g., bounding boxes in a coordinate system selected for the reference document) and/or expected locations of values corresponding to keys (such as boxes within a form, which each contain a keys and blank or filled space for the values). The metadata may be extracted, for example, using machine learning models to which pairs of examples of the same category of reference document are provided as input in some embodiments. Thus, for example, if two examples EF1 and EF2 of a filled-out form of category F1 are provided as input to the ML model, the model may be able to identify text tokens which are common to both examples (and are hence more likely to be keys, since both examples are expected to contain the same keys) as well as text tokens which are different between the two examples (and are hence more likely to represent values for the keys). This machine learning-based approach to extracting content relationship information may represent an example of unsupervised learning, in that the pairs of examples used as input to the models need not be labeled.

Optionally, in some embodiments, input pertaining to the reference documents may be obtained from one or more human annotators and/or the clients on whose behalf the reference documents are to be used (element 407). Such input may be used, for example, to confirm or enhance the metadata extracted automatically from the reference documents. The metadata of the reference documents R1, R2, . . . , e.g., in the form of one or more descriptors for corresponding content elements, may be stored in a repository designed for efficient searches in the depicted embodiment (element 410). Such a repository may for example use a search service of a provider network, at which a variety of search indexes may be constructed for the metadata. The information stored in the repository may be used to process at least some subsequent requests for extracting content from document images (element 413) in various embodiments. For example, as described above, similar referenced documents to a target document may be utilized for a detailed layout-aware analysis.

Figure 5:
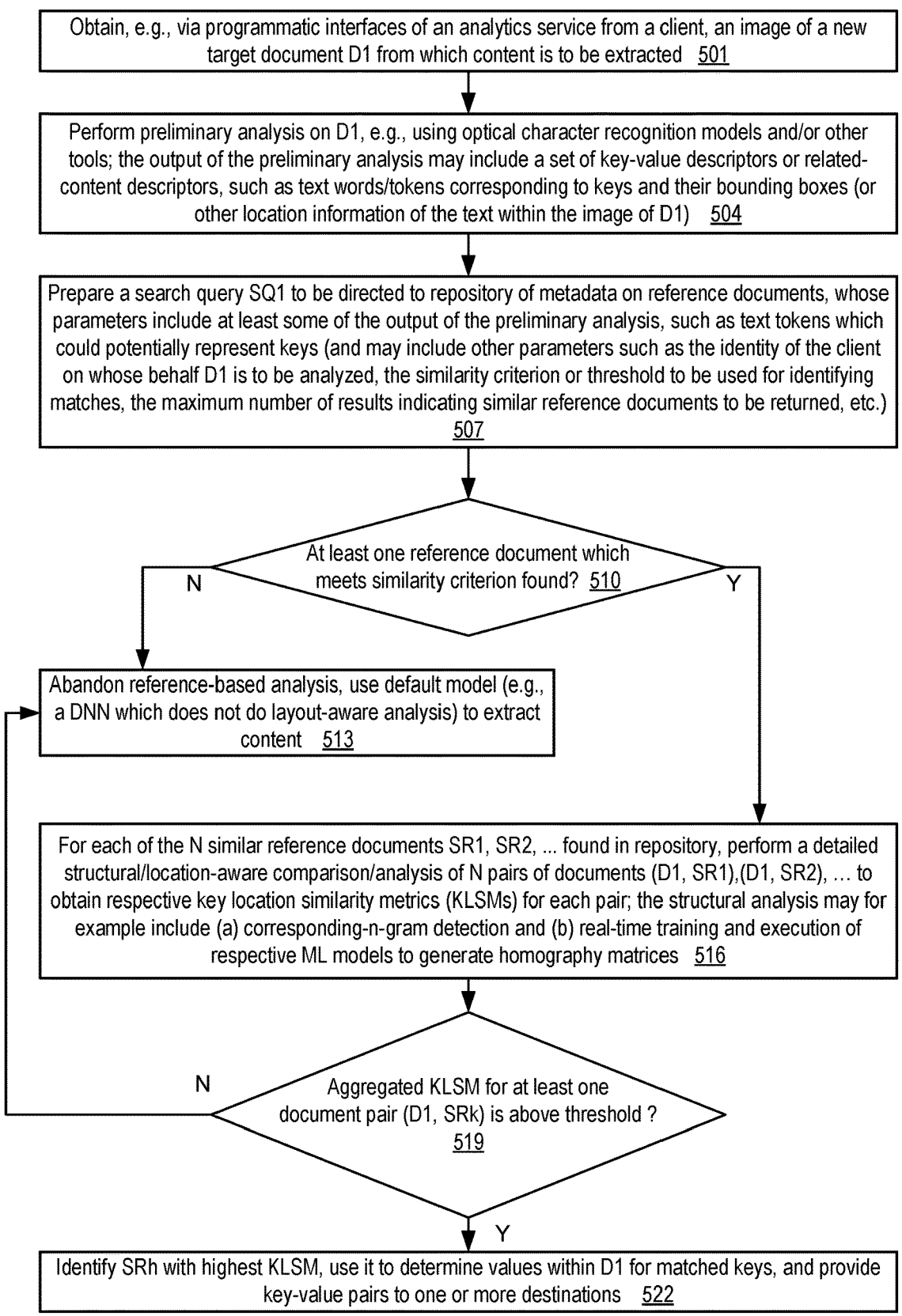
FIG. 5 is a flow diagram illustrating aspects of operations that may be performed in a real-time multi-stage content extraction pipeline, including a reference repository query stage, a corresponding-n-gram detection stage, and a homography matrix learning stage, according to at least some embodiments.

FIG. 5 is a flow diagram illustrating aspects of operations that may be performed in a real-time multi-stage content extraction pipeline, including a reference repository query stage, a corresponding-n-gram detection stage, and a homography matrix learning stage, according to at least some embodiments. An image of a new (i.e., previously unseen at the analytics service) document D1 from which content is to be extracted may be obtained (element 501), e.g., via a programmatic interface from a client of an analytics service similar in functionality to analytics service 102 of FIG. 1.

A preliminary analysis of D1 may be performed (element 504), e.g., using optical character recognition models and/or other tools in various embodiments. The output of the preliminary analysis may, for example, include a set of key-value descriptors or other types of related-content descriptors, such as text words or tokens corresponding to various keys and corresponding bounding boxes (or other similar location information of the text tokens within the image of D1.

A search query SQ1 may be prepared using the results of the preliminary analysis (element 507), to be directed to the repository of metadata on reference documents in the depicted embodiment. The parameters of SQ1 may, for example, include text tokens representing potential keys. In some implementations SQ1 may include other parameters, include the identity of the client on whose behalf D1 is to be analyzed (which may be used to limit the set of reference documents to be considered as discussed earlier), the similarity threshold to be used to select reference documents, the maximum number of results indicating similar reference documents which should be returned, and so on. A limit on the number of matching reference documents may be placed, in some embodiments, for example, because of stringent constraints on the total time within which the pipeline is to be executed. If too many similar reference documents are returned, the total time spent in the pairwise structural comparison phase of the pipeline may become too long to meet the constraints.

If the number of reference documents which meet (based on the analysis of the metadata stored for reference documents with respect to the parameters of SQ1) selected similarity criteria with respect to the target document is zero (as detected in operations corresponding to element 510), the reference-based analysis approach may be abandoned for D1 in at least some embodiments (element 513). Instead, a default model (e.g., a deep learning model which does not perform layout-aware analysis) may be utilized to extract content from D1.

If at least one sufficiently similar reference document (e.g., SRL SR2, . . . ) is found (as also determined in operations corresponding to element 510), a detailed structural or location-aware comparison analysis may be performed with respect to each of the similar reference documents and D1 in the depicted embodiment (element 516). If N similar reference documents are returned in the results of SQ1, N pairs of documents may be analyzed: (D1, SR1), (D1, SR2), (D1, SR3), (D1, SRN). From each pair, respective key location similarity metrics (KLSMs) may be computed for one or more keys in various embodiments. The structural analysis may comprise (a) a corresponding-n-gram detection phase (discussed in further detail below in the context of FIGS. 6), and (b) real-time training and execution of N ML models to generate respective homography matrices (discussed in further detail below in the context of FIG. 7) for the document pairs in some embodiments.

If the aggregated KLSMs for at least one document pair (D1, SRk) is above a selected threshold, as detected in operations corresponding to element 519, the reference document with the highest KLSM (the one with the most keys that are in similar locations to corresponding keys in the target document) may be selected as the one to be used to extract the values corresponding to the keys (element 522). The contents of D1 may be projected onto the selected most-similar reference document SRh, and the values for the matching keys may be extracted from D1 based on the projection in various embodiments. The extracted key-value pairs may be provided to one or more destinations in the depicted embodiment. If the aggregated KLSMs of none of the document pairs is above the threshold, this may be interpreted as an indication that none of the reference documents belongs to the same category of documents as D1, so the reference-based approach may be abandoned (element 513) and the default model may be used for extracting D1 content in at least some embodiments.

Figure 6:
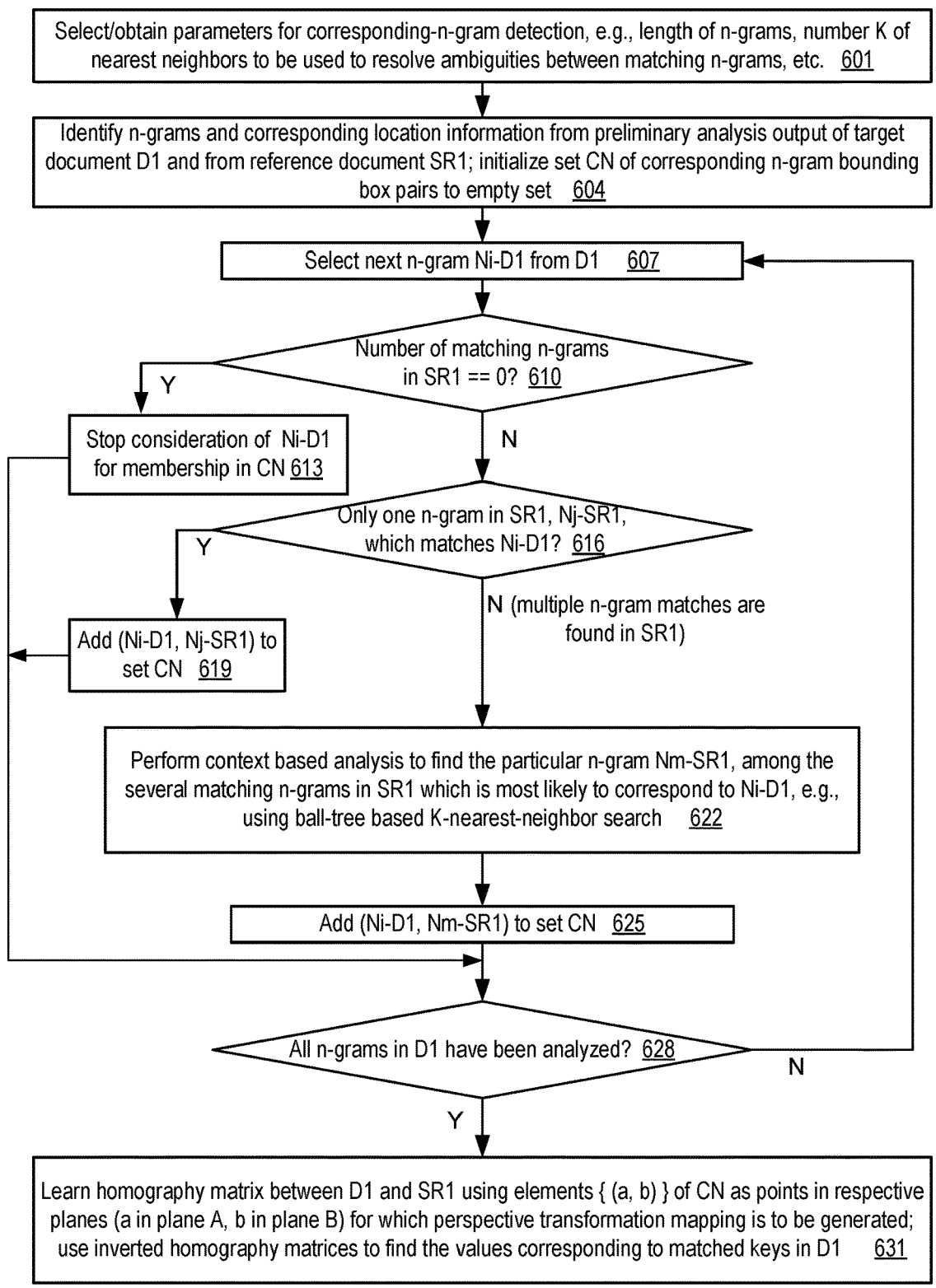
FIG. 6 is a flow diagram illustrating aspects of operations that may be performed to detect corresponding n-grams which may be used to extract content from a document, according to at least some embodiments.

FIG. 6 is a flow diagram illustrating aspects of operations that may be performed to detect corresponding n-grams which may be used to extract content from a document, according to at least some embodiments. A pair of documents, including a target document D1 and a sufficiently-similar reference document SR1 may be analyzed together to identify n-grams that occur in both. As shown in element 601, a set of parameters for corresponding-n-gram detection may be selected or obtained at an analytics service similar in functionality to analytics service 102 of FIG. 1. The parameters may include, among others, the lengths of n-grams to be considered, the number K of nearest neighbor n-grams to be used to resolve ambiguities between matching n-grams, and so on.

The output of the preliminary analysis of the target document D1 may be analyzed to obtain n-grams of the selected length or lengths (element 604). Similarly, n-grams of the selected lengths may be obtained from the metadata available on SR1. A set CN which is to be used to store n-gram bounding box pairs for corresponding or matching n-grams of the two documents may be initialized to the empty set.

The n-grams identified from one of the documents of the (D1, SR1) pair may be considered iteratively, one at a time, to identify matching n-grams in the other document in some embodiments. For example, the next n-gram Ni-D1 may be selected from D1 (element 607). The number of n-grams found in SR1 that match Ni-D1 (e.g., contain the same text tokens in the same sequence) may be determined. If the number of matching n-grams is zero (as detected in operations corresponding to element 610), Ni-D1 may be ignored with respect to inclusion in CN (element 613).

If only one n-gram in SR1, Nj-SR1, matches Ni-D1 (as detected in operations corresponding to element 616), this means that there is no ambiguity to be resolved with respect to n-gram correspondence for Ni-D1. A single match indicates that Nj-SR1 and Ni-D1 correspond to one another, and hence that, assuming Nj-SR1 is part of a key, information about Nj-SR1 (such as its position within SR1, when projected back to D1) can very likely be used to extract the value of Ni-D1's key. Accordingly, the corresponding-n-gram-pair (Ni-D1, Nj-SR1) may be added to the set CN in the depicted embodiment (element 619).

If there are multiple matches in SR1 to Ni-D1 (as may also be detected in operations corresponding to element 616), a context based analysis may be performed to find the particular n-gram Nm-SR1, among the several matches, which is most likely to correspond to Ni-D1 (element 622). Such a context-based analysis may be conducted using any of several different algorithms and data structures in different embodiments, such as ball trees. A ball tree is a binary tree in which every node defines a D-dimensional hypersphere, or ball, containing a subset of the points to be searched. In the case of documents, the hypersphere or ball is a circle since document images are two-dimensional spaces. Each internal node of a ball tree partitions data points into two disjoint sets which are associated with different balls. While the balls themselves may intersect, each point is assigned to one or the other ball in the partition according to its distance from the ball's center. Each leaf node in the ball tree defines a ball and enumerates all data points inside that ball. Each node in the tree defines the smallest ball that contains all data points in its subtree. This gives rise to the useful property that, for a given test point t, the distance to any point in a ball B in the tree is greater than or equal to the distance from t to the ball. A ball-tree can be constructed in O(n log n) time complexity where n is the number of points in various embodiments.

Ball trees makes it efficient to query for K-nearest word (or n-gram) bounding boxes given any point in a two dimensional space. Ball-tree based algorithms can be easily modified to produce all nearest text bounding boxes within a fixed radius, and thus (in the case of n-gram correspondence analysis) identify the K nearest neighbor n-grams or words from a given n-gram. If, for example, there are two n-grams N1-SR1 and N2-SR1 within SR1 that match Ni-D1, the respective set of K nearest neighbor n-grams of Ni-D1 (within D1), N1-SR1 (within SR1) and N2-SR1 (within SR1) may be identified in some embodiments using respective ball trees constructed for the n-grams of D1 and the n-grams of SR1 in some embodiments. Let KNN-N1 denote the K nearest neighbors of N1-SR1, KNN-N2 denote the K nearest neighbors of N2-SR1, and KNN-Ni denote the K nearest neighbors of Ni-D1. From among KNN-N1 and KNN-N2, the set of nearest neighbors which overlaps to a greater extent to KNN-Ni may be identified (assuming one of the overlaps is greater than the other). If it is KNN-N1 that has the greater overlap, then N1-SR1 is assumed to correspond to Ni-D1; if it is KNN-N2 which has the greater overlap, then N2-SR1 is assumed to correspond to Ni-D1. In effect, this approach relies on using neighborhood information (what other n-grams are present in the near vicinity of a given n-gram in its document) to predict which particular apparently matching n-gram is the one that should be used for content extraction.

After the context-based analysis is conducted and a particular n-gram Nm-SR1 has been identified as the one which corresponds most closely to Ni-D1, the n-gram pair (Ni-D1, NM-SR1) may be added to set CN in various embodiments (element 625). If all the n-grams in D1 have not yet been analyzed (as determined in operations represented in element 628), the next n-gram that is yet to be analyzed may be selected as Ni-D1, and operations corresponding to elements 607 onwards may be performed with respect to it. If all the n-grams of D1 have been analyzed, a homography matrix (an example of a geometric transformation data structure) may be learned on the fly for the pair of documents (D1, SR1), using elements of CN as points in respective planes (element 631). For example, if CN contains pairs of corresponding n-grams (N1-D1, Nk-SR1), (N2-D1, N1-SR1), etc., the x-y coordinates within D1 of the first elements of each of the pairs (N1-D1, N2-D1, . . . ) may represent points of interest within a plane representing D1, while the x-y coordinates within SR1 of each of the second elements of the pairs (Nk-DR1, N1-SR1, . . . ) may represent corresponding points of interest within a plane representing D2. After the homography matrix is learned, e.g., using an online or real-time machine learning model, the inverted homography matrix may be used to project the content of the reference document SR1 back onto D1, and the values associated with the keys that are common to SR1 and D1 may be extracted from the projection.

Figure 7:
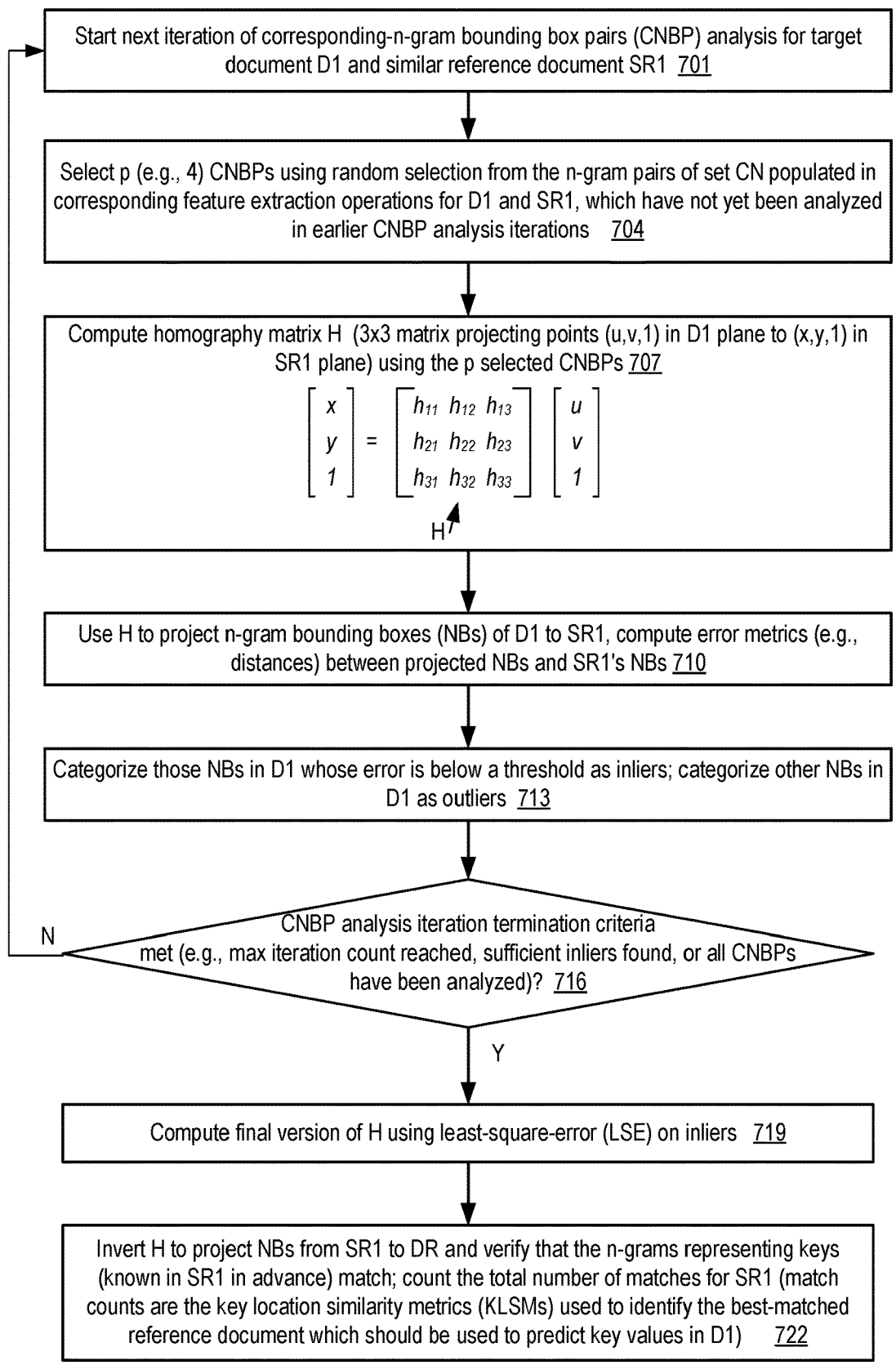
FIG. 7 is a flow diagram illustrating aspects of operations that may be performed to learn homography matrices which may be used to extract content from a document, according to at least some embodiments.

FIG. 7 is a flow diagram illustrating aspects of operations that may be performed to learn homography matrices which may be used to extract content from a document, according to at least some embodiments. The technique shown in FIG. 7 may represent one example of a random sample consensus (RANSAC) based algorithm. As shown in element 701, an iteration of corresponding-n-gram bounding box pairs (CNBP) analysis may be initiated for a target document D1 and a similar reference document SR1. In various embodiments, the CNBPs may have been identified using the type of analysis (including, in cases where ambiguities have to be resolved, nearest-neighbor based analysis) illustrated in FIG. 6, with each CNBP representing the bounding boxes of each corresponding n-gram pair in the set CN indicated in FIG. 6. A given bounding box may, for example, be represented by a coordinate pair (x1, y1) and (x2, y2) representing the lower left corner of the box and the upper right corner of the box within its coordinate space.

In the embodiment depicted in FIG. 7, some number of CNBPs (e.g., 4) of the members of CN members may be selected using random selection for the current iteration of CNBP analysis, by selecting that number of elements of CN which have not yet been considered in a previous iteration (element 704) and identifying corresponding bounding boxes. Then, a 3×3 homography matrix H which projects points (u, v, 1) in the D1 plane (the plane corresponding to the target document) to (x, y, 1) in the SR1 plane (the plane corresponding to the reference document) may be learned or computed from the selected CBNP points (element 707) on the fly, e.g., using an online machine learning model which is trained and executed in real time, in the depicted embodiment.

The matrix H may be used to project n-gram bounding boxes (NBs) of D1 to SR1, compute error metrics (e.g., Euclidean distances) between the projected NBs and SR1's own corresponding NBs (element 710). The NBs in D1 whose error metrics are below a threshold as inliers, and the remaining NBs as outliers (element 713) in the depicted embodiment. If the CNBP analysis iteration termination criterion is met (e.g., if a pre-selected maximum iteration count has been exceeded, or if the number of inliers that have been identified exceeds a threshold, or all CNBPs have been considered), as detected in operations corresponding to element 716, the final version of H may be computed using least-square-error (LSE) on the inliers in some embodiments (element 716). If the CNBP analysis iteration termination criteria have not been met, the next iteration may be initiated, with operations of elements 701 onwards being repeated for a new set of randomly selected CNBPs.

After the final version of H has been computed/learned in operations corresponding to element 719, that final version may be inverted to project NBs from SR1 to D1 and verify that the n-grams representing keys (which are known in the reference document SR1, as it has been analyzed and/or annotated prior to storing it in the reference object repository) match the n-grams in D1 (element 722). The number of verified matching keys may be counted using the approach illustrated in FIG. 7 for each of the reference documents SR1, SR2, . . . , being analyzed. The number of verified matching keys may be used as the key location similarity metric (KLSMs) discussed in the content of FIG. to select the best-matched of the reference documents, which may then be used to extract corresponding values for the matched keys. For example, if there are only two reference documents SR1 and SR2 being considered, and the number of verified matching keys identified using a homography matrix learned for (D1, SR1) is 20, and the number of verified matching keys identified using a homography matrix learned for (D1, SR2) is 15, then SR1 may be selected as the best-matching reference document, and the projections of SR1 elements to D1 may be used to select the values for at least the 20 matched keys in the depicted embodiment.

It is noted that in various embodiments, some of the operations shown in FIG. 4, FIG. 5, FIG. 6 and/or FIG. 7 may be implemented in a different order than that shown in the figure, or may be performed in parallel rather than sequentially. Additionally, some of the operations shown in FIG. 4, FIG. 5, FIG. 6 and/or FIG. 7 may not be required in one or more implementations.

Example Programmatic Interactions

Figure 8:
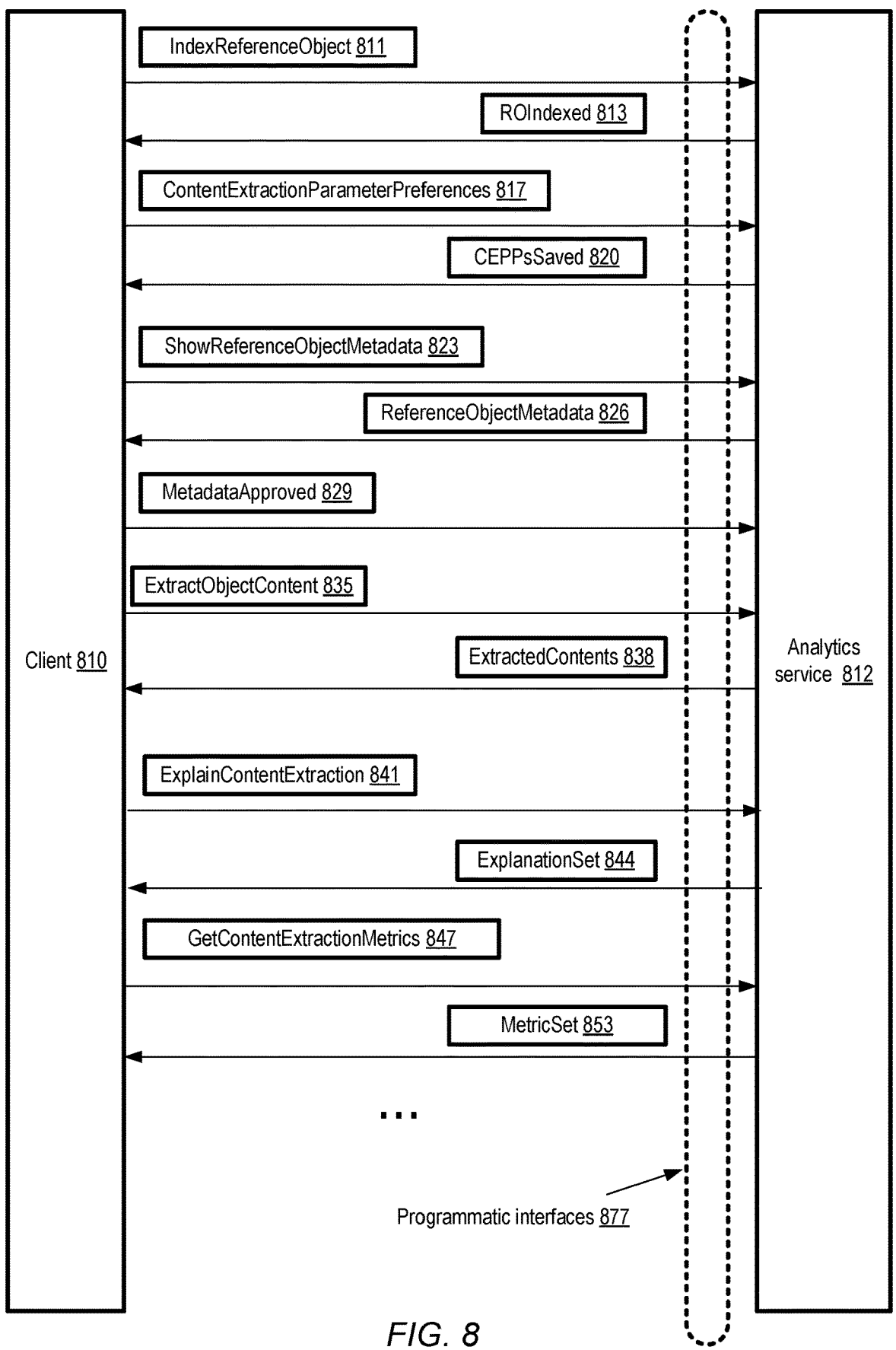
FIG. 8 illustrates example programmatic interactions between clients and an analytics service at which content may be extracted from target data objects using reference objects, according to at least some embodiments.

FIG. 8 illustrates example programmatic interactions between clients and an analytics service at which content may be extracted from target data objects using reference objects, according to at least some embodiments. An analytics service 812, similar in features and functionality to analytics service 102 of FIG. 1, may implement a set of programmatic interfaces 877 in the depicted embodiment, such as web-based consoles, command-line tools, graphical user interfaces, application programming interfaces and the like. Clients 810 of the analytics service 812 may use the programmatic interfaces 877 to submit various kinds of messages or requests and receive corresponding responses in various embodiments.

A client 810 may, for example, submit an IndexReferenceObject request 811 in some embodiments to request the inclusion of metadata about a reference object within the repository used for structural comparison analysis of the kind discussed earlier. In response to such a request to index the reference object, metadata (including one or more types of related-content descriptors discussed above) pertaining to the reference object may be obtained at the analytics service, e.g., with the help of machine learning models and/or human annotators, and the metadata may be stored within the repository. After the metadata has been stored, an ROIndexed response message 813 may be sent to the client in some embodiments. In some embodiments, a client may supply annotations or metadata along with the reference object itself in the IndexReferenceObject message.

Some clients of the analytics service may use programmatic interfaces 877 to provide preferences or settings for various parameters of the algorithms to be used on their behalf at the different stages of the pipeline used for content extraction. Such guidance may be provided, for example, via one or more ContentExtractionParameterPreferences messages 817 in the depicted embodiment. Preferred values for any combination of one or more parameters such as the maximum number of ranked results (indicating reference objects found similar, in the initial coarse analysis using token matching or the like) to be returned from the repository, the thresholds to be used for selecting such similar reference documents, the kinds of search algorithms to be used when identifying the similar reference documents, the sizes of the n-grams to be used for populating the corresponding n-grams, the number of nearest neighbors to be considered in the corresponding-gram analysis, thresholds to be used for designating inliers and outliers in the homography matrices, and so on, may be provided by the client in different embodiments. The parameter preferences may be saved at the analytics service and used on behalf of the client for subsequent analyses. A CEPPsSaved response message 820 may be sent to the client in at least some embodiments to acknowledge that the parameter settings have been saved. Note that different clients may provide distinct parameter preferences in at least some embodiments; as such, the analytics service may be able to customize the algorithms used for respective clients.

According to some embodiments, a client 810 may request to view the annotations, descriptors or other metadata associated with reference objects being used for the client's target data objects, e.g., by submitting one or more ShowReferenceObjectMetadata requests 823. In response, the analytics service 812 may provide the requested metadata in a ReferenceObjectMetadata message 826 in some embodiments. The client 810 may send a MetadataApproved message 829 to indicate that the supplied metadata seems correct and has been approved in the depicted embodiment.

Clients may submit ExtractObjectContent requests 835 to request that content including key value pairs or groups, tables, text, etc., be extracted from a specified data object in various embodiments. In at least some embodiments, the techniques introduced earlier (e.g., the enhanced methodology shown in FIG. 3) may be used to obtain predictions for the content of the object in real time, and the content may be provided to the client (e.g., along with confidence level information for various portions of the content) in an ExtractedContents message 838.

In some embodiments, a client 810 may submit a request (ExplainContentExtraction 841) to obtain an explanation for the results of the content extraction methodology for a given target data object. In response, some of the data generated internally during the analysis of the target data object, such as the specific reference document selected, the matching keys identified, the error metrics associated with the keys, and so on, may be presented to the client via one or more explanatory messages such as ExplanationSet messages 844.

In various embodiments, metrics such as the total number of times that the reference-based content extraction algorithm was used successfully (e.g., as opposed to the fallback approach of using the deep neural network model) for a client over some time period, the average latency for producing the extracted content, the amount of CPU or GPU time used for some number of target object analyses, and so on, may be collected on behalf of different clients at the analytics service. In response to a GetContentExtractionMetrics message 847 from a client, such metrics may be provided in a MetricsSet response 853 in the depicted embodiment. It is noted that other types of programmatic interactions related to the use of reference objects for content extraction, not shown in FIG. 8, may be supported by an analytics service 812 in some embodiments.

Example Provider Network Environment

Figure 9:
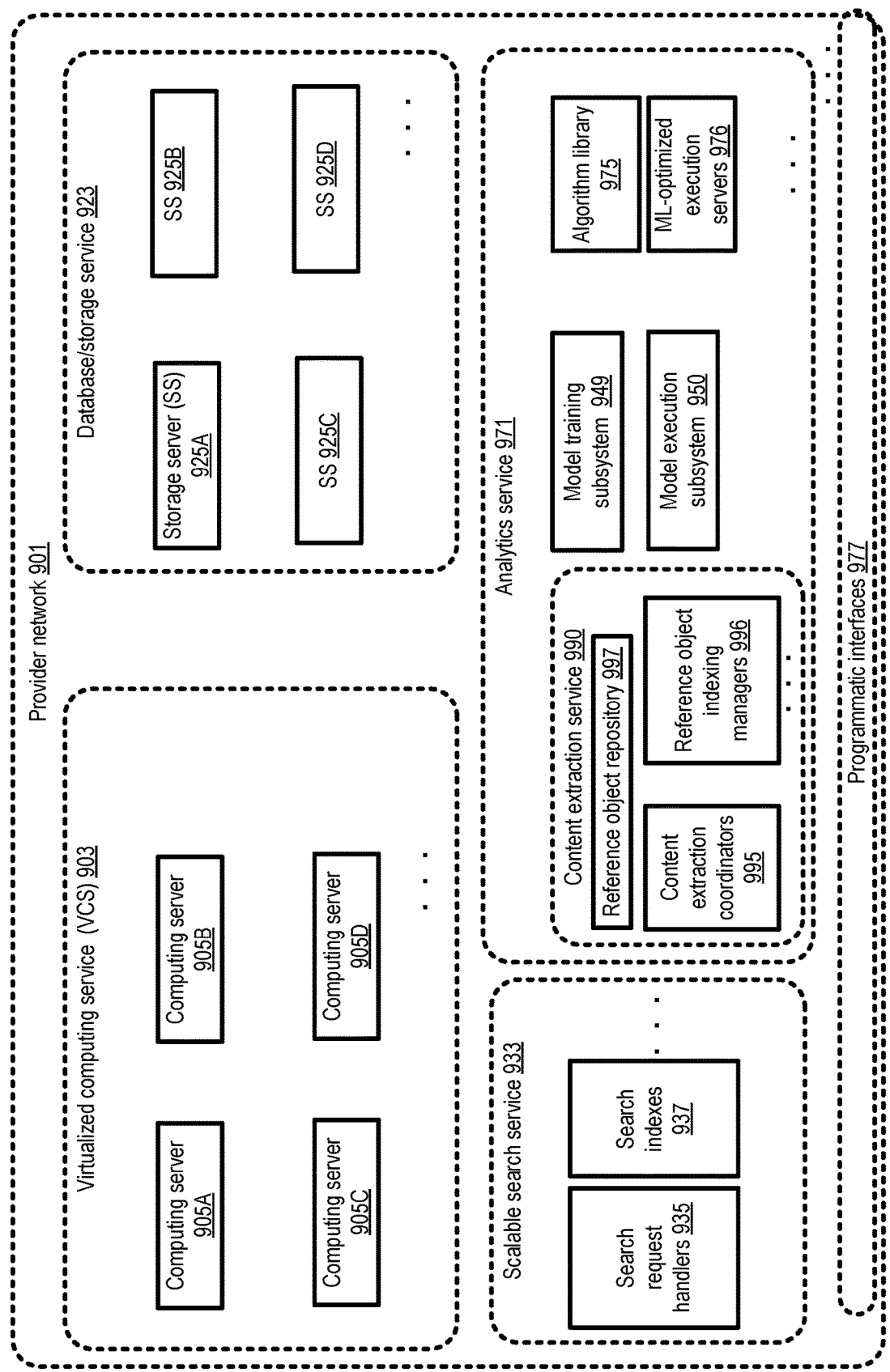
FIG. 9 illustrates an example provider network environment in which an analytics service may be implemented, according to at least some embodiments.

FIG. 9 illustrates an example provider network environment in which an analytics service may be implemented, according to at least some embodiments. In the depicted embodiment, provider network 901 may comprise resources used to implement a plurality of services, including for example a virtualized computing service (VCS) 903, a database/storage service 923, a scalable search service 933 as well as an analytics service 971 within which a content extraction service 990 at which the reference object based content extraction techniques mentioned above may be implemented.

The analytics service 971, which may also be referred to as a machine learning service or an artificial intelligence service, may comprise algorithm library 975, model training subsystem 949 at which various types of models (including the kinds of models used in various aspects of the content extraction workflows described earlier) may be trained and re-trained using algorithms from library 975, model execution subsystem 950 at which the models are executed, as well as a set of machine learning-optimized execution servers 976 (e.g., servers comprising chipsets developed specifically for ML tasks) in the depicted embodiment. The content extraction service 990 may include content extraction coordinators 995, reference object indexing managers 996 and a reference object repository 997 (similar in functionality to the components with the same names shown in FIG. 1) in the depicted embodiment. Scalable search service 933 may comprise search request handlers 935 and search indexes 937, which may be utilized to process search requests directed to reference object repository 997 in some embodiments.

Components of a given service may utilize components of other services in the depicted embodiment—e.g., for some machine learning service tasks, virtual machines implemented at computing servers such as 905A-905D of the virtualized computing service 903 may be used, reference objects and target data objects of the content extraction service may be stored a storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment. The provider network may include numerous other services in some embodiments, such as parallel computing services, application development and deployment management services, and so on.

Illustrative Computer System

Figure 10:
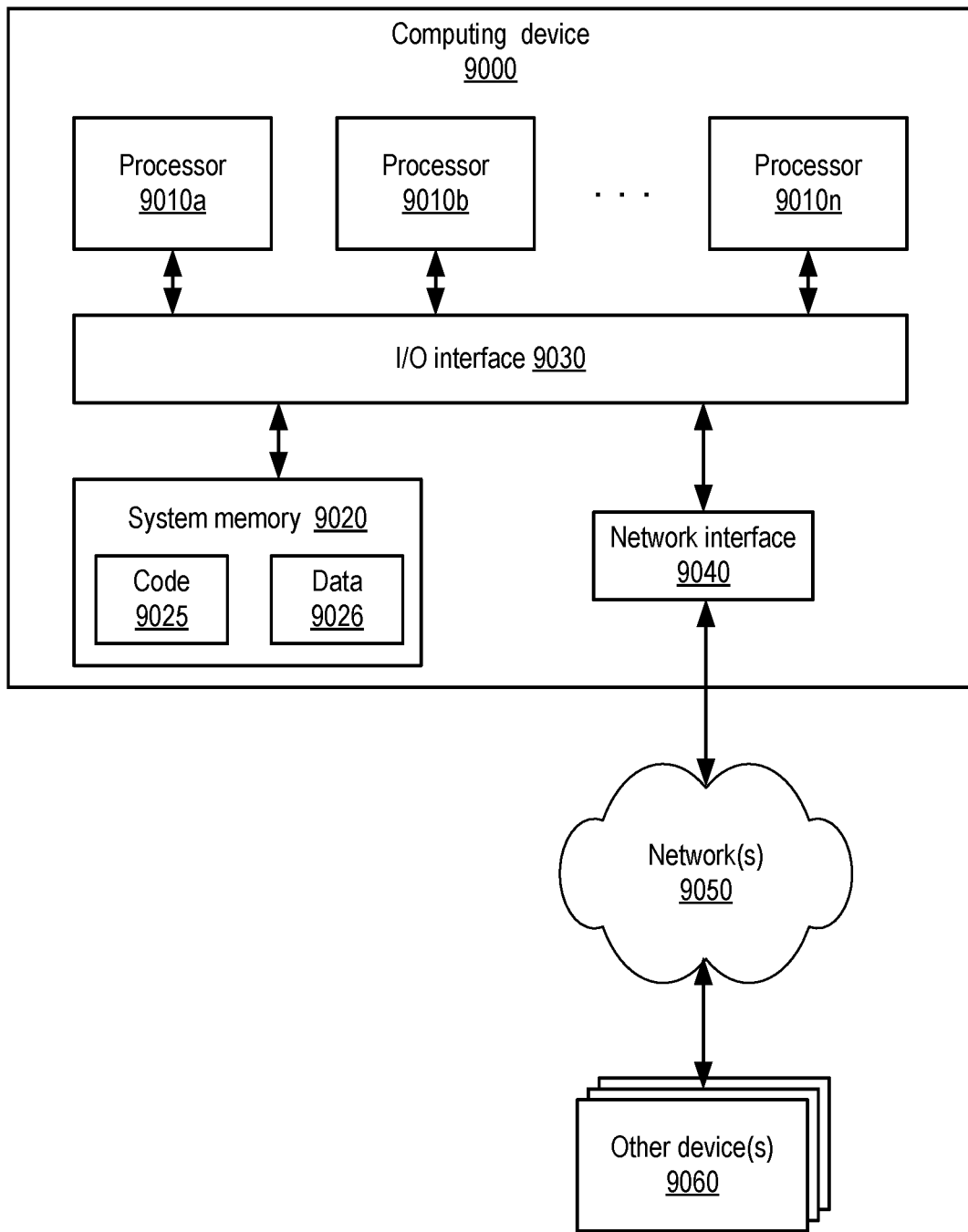
FIG. 10 is a block diagram illustrating an example computing device that may be used in at least some embodiments.

In at least some embodiments, a server that implements the types of techniques described herein (e.g., various functions of analytics service as well as other services of a provider network) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices that implement an analytics service of a provider network;
    wherein the one or more computing devices include instructions that upon execution on or across the one or more computing devices cause the one or more computing devices to:
        store, in a repository of the analytics service, respective sets of descriptors corresponding to content identified within images of individual ones of one or more reference documents, wherein a particular descriptor comprises information about at least a text key within an image of a reference document;
        in response to a first request to extract content from an image of a particular document, perform a first content extraction on the image of the particular document, to:
            identify, using a first query directed to the repository, at least a first reference document, wherein the particular document is distinct from the one or more reference documents including the first reference document, and wherein a first set of descriptors of the first reference document meets a similarity criterion with respect to a second set of descriptors obtained from the image of the particular document, wherein the second set of descriptors is obtained using a first set of one or more machine learning models to which the image of the particular document has been provided as input, and wherein the first set of one or more machine learning models comprises an optical character recognition model; and based at least in part on a result of the first query, perform a layout-aware matching analysis of the particular document and the first reference document to project respective portions of the image of the particular document onto the first reference document, wherein the layout-aware matching analysis comprises computing an estimate of a difference in location of (a) a first key within a projected representation of the image of the particular document and (b) the first key within the first reference document, and the projected representation is used to extract a first predicted value corresponding to the first key from the particular document; and in response to a second request to extract content from an image of another document after the respective sets of descriptors have been stored, perform a second content extraction on the image of the other document, to:

execute a second query on the repository, wherein a result of the second query indicates that the repository does not comprise a reference document whose descriptors meet the similarity criterion with respect to descriptors obtained from the other document; and based at least in part on the result of the second query, utilize a second set of one or more machine learning models to extract, from the other document, a second predicted value corresponding to a second key, wherein the second set of one or more machine learning models comprises at least one model which is not used for the layout-aware matching analysis;

wherein the first content extraction achieves a performance improvement based at least in part on use of the layout-aware matching analysis of the particular document and the first reference document, to (a) improve an accuracy of extracted content or (b) reduce an amount of compute, memory, or storage resources used to extract content.

2. The system as recited in claim 1, wherein the projected representation of the image of the particular document is obtained, at least in part, by one or more of: (a) computing a homography matrix or (b) performing a non-rigid transformation.

3. The system as recited in claim 1, wherein the one or more computing devices include further instructions that upon execution on or across the one or more computing devices further cause the one or more computing devices to:
obtain at least a portion of a descriptor of the first set of descriptors from an annotator via a programmatic interface.

4. The system as recited in claim 1, wherein the one or more computing devices include further instructions that upon execution on or across the one or more computing devices further cause the one or more computing devices to:
obtaining, via one or more programmatic interfaces, an indication of at least one reference document of the one or more reference documents.

5. The system as recited in claim 1, wherein the one or more computing devices include further instructions that upon execution on or across the one or more computing devices further cause the one or more computing devices to:
obtain, via one or more programmatic interfaces, an indication of approval of a descriptor of the first set of descriptors.

6. A computer-implemented method performed by an analytics service, comprising:
storing, in a repository, respective sets of descriptors associated with individual ones of one or more reference objects, wherein a particular descriptor of a particular set of descriptors comprises information pertaining to at least a key identified within a particular reference object;

in response to a first request to extract content from a particular data object, performing a content extraction on the particular data object, including:
identifying a first reference object using a result of a first query directed to the repository, wherein the particular data object is distinct from the one or more references objects including the first reference object and, wherein the first reference object meets a similarity criterion with respect to the particular data object, wherein a parameter of the first query is based at least in part on output generated by a first set of one or more machine learning models to which the particular data object has been provided as input, and wherein the result of the first query is based at least in part on analysis of one or more descriptors associated with the first reference object;

based at least in part on the result of a first query, performing a structural comparison of the particular data object and the first reference object to determine a projection of respective portions of the particular data object onto the first reference object;

extracting, using the projection, a first prediction of a particular value associated with a key in the particular data object; and transmitting the first prediction to one or more destinations;

wherein the content extraction achieves a performance improvement based at least in part on use of the structural comparison of the particular data object with the first reference object, to (a) improve an accuracy of extracted content or (b) reduce an amount of compute, memory, or storage resources used to extract content.

7. The computer-implemented method as recited in claim 6, wherein the first reference object comprises one or more of: (a) text, (b) one or more images, (c) one or more videos, or (d) one or more audio segments.

8. The computer-implemented method as recited in claim 6, further comprising:
obtaining, via one or more programmatic interfaces, a request to index the first reference object, wherein a descriptor of the first reference object is stored in the repository in response to the request to index the first reference object.

9. The computer-implemented method as recited in claim 6, further comprising:
determining the result of the first query using one or more of (a) text token matching, (b) a spatial search using distances computed between respective vector representations of at least a portion of the first reference object and at least a portion of the particular data object.

10. The computer-implemented method as recited in claim 6, further comprising:
obtaining a descriptor from an annotator via a programmatic interface prior to storing the descriptor in the repository.

11. The computer-implemented method as recited in claim 6, further comprising:

obtaining, via one or more programmatic interfaces, an indication of the similarity criterion.

12. The computer-implemented method as recited in claim 6, wherein the structural comparison comprises (a) identifying one or more pairs of corresponding content elements, wherein an individual pair of corresponding content elements comprises a first content element extracted from the particular data object and a second content element extracted from the first reference object and (b) computing a geometric transformation between respective first content elements of the one or more pairs and respective second content elements of the one or more pairs.

13. The computer-implemented method as recited in claim 12, wherein identifying the one or more pairs of content elements comprises identifying one or more n-grams which are (a) present in the particular data object and (b) present in the first reference object.

14. The computer-implemented method as recited in claim 12, wherein identifying the one or more pairs of content elements comprises performing a K-nearest neighbor (KNN) search with respect to a content element present in the particular data object.

15. The computer-implemented method as recited in claim 12, wherein computing the geometric transformation comprises one or more of: (a) computing a homography matrix or (b) performing a non-rigid transformation.

16. One or more non-transitory computer-accessible storage media storing program instructions that when executed on or across one or more processors implement an analytics service and cause the analytics service to:
    store, in a repository, respective sets of descriptors associated with individual ones of one or more reference objects, wherein a particular descriptor of a particular set of descriptors comprises information pertaining to a particular entity identified within a particular reference object;
    in response to a first request to extract content from a particular data object, perform a content extraction on the particular data object, to:
        identify a first reference object using a result of a first query directed to the repository, wherein the particular data object is distinct from the one or more reference objects including the first reference object, wherein the first reference object meets a similarity criterion with respect to the particular data object, wherein a parameter of the first query is based at least in part on output generated by a first set of one or more machine learning models to which the particular data object has been provided as input, and wherein the result of the first query is based at least in part on analysis of one or more descriptors associated with the first reference object;
        based at least in part on the result of a first query, perform a structural comparison of the particular data object and the first reference object to determine a projection of respective portions of the particular data object onto the first reference object;
        extract, using the projection, a first prediction of another entity associated with the particular entity in the particular data object; and
        transmit the first prediction to one or more destination;
        wherein the content extraction achieves a performance improvement based at least in part on use of the structural comparison of the particular data object with the first reference object, to (a) improve an accuracy of extracted content or (b) reduce an amount of compute, memory, or storage resources used to extract content.

17. The one or more non-transitory computer-accessible storage media as recited in claim 16, storing further program instructions that when executed on or across one or more processors further cause the one or more processors to:
    train, using a training data set comprising a plurality of labeled data objects, a neural network-based machine learning model to extract, from respective unlabeled data objects, one or more pairs of related entities identified within the respective unlabeled data objects; and
    in response to (a) receiving a second request to extract content from another data object and (b) determining, using a result of a second query directed to the repository, not to perform a structural comparison with respect to the other data object using contents of the repository,
        extract, using the neural network-based machine learning model, a pair of related entities from the other data object.

18. The one or more non-transitory computer-accessible storage media as recited in claim 16, storing further program instructions that when executed on or across one or more processors further cause the one or more processors to:
    transmit a confidence metric associated with the first prediction to the one or more destinations.

19. The one or more non-transitory computer-accessible storage media as recited in claim 16, storing further program instructions that when executed on or across one or more processors further cause the one or more processors to:
    transmit, via one or more programmatic interfaces, an explanatory message indicating one or more factors which resulted in the first prediction.

20. The one or more non-transitory computer-accessible storage media as recited in claim 16, storing further program instructions that when executed on or across one or more processors further cause the one or more processors to:
    transmit, via one or more programmatic interfaces, one or more metrics associated with extraction of content from a plurality of data objects including the particular data object.

* * * * *